United States Patent
Narayanan et al.

(10) Patent No.: US 8,032,355 B2
(45) Date of Patent: Oct. 4, 2011

(54) SOCIALLY COGNIZANT TRANSLATION BY DETECTING AND TRANSFORMING ELEMENTS OF POLITENESS AND RESPECT

(75) Inventors: Shrikanth Narayanan, Santa Monica, CA (US); Panayiotis Georgiou, La Crescenta, CA (US)

(73) Assignee: University of Southern California, Los Angeles, CA (US)

( * ) Notice: Subject to any disclaimer, the term of this patent is extended or adjusted under 35 U.S.C. 154(b) by 885 days.

(21) Appl. No.: 11/752,227

(22) Filed: May 22, 2007

(65) Prior Publication Data

US 2007/0294077 A1    Dec. 20, 2007

Related U.S. Application Data

(60) Provisional application No. 60/747,906, filed on May 22, 2006.

(51) Int. Cl.
*G06F 17/28* (2006.01)
*G10L 21/00* (2006.01)

(52) U.S. Cl. .......................... 704/2; 704/277

(58) Field of Classification Search .................. None
See application file for complete search history.

(56) References Cited

U.S. PATENT DOCUMENTS

| | | | |
|---|---|---|---|
| 2,177,790 A | 10/1939 | Scott | |
| 2,674,923 A | 4/1954 | William | |
| 4,067,122 A | 1/1978 | Fernandez et al. | |
| 4,419,080 A | 12/1983 | Erwin | |
| 4,604,698 A | 8/1986 | Ikemoto et al. | |
| 4,658,374 A | 4/1987 | Tanimoto et al. | |
| 5,161,105 A | 11/1992 | Kugimiya et al. | |
| 5,201,042 A | 4/1993 | Weisner et al. | |
| 5,576,953 A | 11/1996 | Hugentobler | |
| 5,678,001 A | 10/1997 | Nagel et al. | |
| 5,697,789 A | 12/1997 | Sameth et al. | |
| 5,741,136 A | 4/1998 | Kirksey et al. | |
| 5,760,788 A | 6/1998 | Chainini et al. | |
| 5,799,267 A | 8/1998 | Siegel | |
| 5,855,000 A | 12/1998 | Waibel et al. | |
| 5,882,202 A | 3/1999 | Sameth et al. | |
| 5,991,594 A | 11/1999 | Froeber et al. | |
| 5,991,711 A | 11/1999 | Seno et al. | |
| 6,073,146 A | 6/2000 | Chen | |
| 6,243,675 B1 | 6/2001 | Ito | |
| 6,339,754 B1 | 1/2002 | Flanagan et al. | |
| 6,374,224 B1 * | 4/2002 | Horiguchi et al. | 704/266 |
| 6,394,899 B1 | 5/2002 | Walker | |
| 6,669,562 B1 | 12/2003 | Shiino | |
| 6,755,657 B1 | 6/2004 | Wasowicz | |
| 6,859,778 B1 | 2/2005 | Bakis et al. | |
| 6,866,510 B2 | 3/2005 | Polanyi et al. | |

(Continued)

OTHER PUBLICATIONS

U.S. Appl. No. 11/754,148, filed May 25, 2007, in Office Action mailed Jun. 7, 2010, 16 pages.

(Continued)

*Primary Examiner* — Brian L Albertalli
(74) *Attorney, Agent, or Firm* — Fish & Richardson P.C.

(57) ABSTRACT

A socially-cognizant translation system that takes social state between speaker and listener into account when making the translation. The translation may be more formal or less formal based on the social relationship between speaker and listener. Profanities in the source speech may be detected, and used to determine the social cognizance. Also, the source speech can be translated without the profanity in the target language, instead using the meaning of the profanity.

19 Claims, 3 Drawing Sheets

U.S. PATENT DOCUMENTS

| | | | |
|---|---|---|---|
| 6,970,821 B1* | 11/2005 | Shambaugh et al. | 704/270 |
| 7,016,829 B2 | 3/2006 | Brill et al. | |
| 7,155,382 B2 | 12/2006 | Boys | |
| 7,238,024 B2 | 7/2007 | Rehbein et al. | |
| 7,409,348 B2 | 8/2008 | Wen et al. | |
| 7,461,001 B2 | 12/2008 | Liqin et al. | |
| 7,689,407 B2 | 3/2010 | Yang et al. | |
| 7,689,422 B2 | 3/2010 | Eves et al. | |
| 2002/0059056 A1 | 5/2002 | Appleby | |
| 2002/0095281 A1* | 7/2002 | Cox et al. | 704/2 |
| 2002/0184002 A1* | 12/2002 | Galli | 704/7 |
| 2004/0083111 A1 | 4/2004 | Rehbein et al. | |
| 2004/0210923 A1 | 10/2004 | Hudgeons et al. | |
| 2004/0248068 A1 | 12/2004 | Davidovich | |
| 2005/0014563 A1 | 1/2005 | Barri | |
| 2005/0084829 A1 | 4/2005 | Peters | |
| 2005/0165645 A1 | 7/2005 | Kirwin | |
| 2005/0216256 A1* | 9/2005 | Lueck | 704/10 |
| 2006/0212288 A1 | 9/2006 | Sethy et al. | |
| 2006/0293874 A1 | 12/2006 | Zhang et al. | |
| 2007/0015121 A1 | 1/2007 | Johnson et al. | |
| 2007/0208569 A1 | 9/2007 | Subramanian et al. | |
| 2008/0003551 A1 | 1/2008 | Narayanan et al. | |
| 2008/0040095 A1 | 2/2008 | Sinha et al. | |
| 2008/0065368 A1 | 3/2008 | Narayanan et al. | |
| 2008/0071518 A1 | 3/2008 | Narayanan et al. | |
| 2008/0255824 A1 | 10/2008 | Aso | |
| 2008/0268955 A1 | 10/2008 | Spittle | |
| 2009/0106016 A1* | 4/2009 | Athsani et al. | 704/3 |
| 2010/0009321 A1 | 1/2010 | Purushotma | |

OTHER PUBLICATIONS

U.S. Appl. No. 11/754,148, filed May 25, 2007, Office Action mailed Jun. 7, 2010, 15 pages.

U.S. Appl. No. 11/750,926, filed May 18, 2007, Office Action mailed Nov. 1, 2010, 20 pages.

U.S. Appl. No. 11/749,677, filed May 16, 2007, Office Action mailed Aug. 31, 2010, 12 pages.

U.S. Patent Office, U.S. Appl. No. 11/750,962, in Office Action dated Nov. 1, 2010, 26 pages.

U.S. Patent Office, U.S. Appl. No. 11/750,962, in Office Action dated Apr. 19, 2011, 15 pages.

* cited by examiner

SOCIALLY COGNIZANT TRANSLATION BY DETECTING AND TRANSFORMING ELEMENTS OF POLITENESS AND RESPECT

CROSS-REFERENCE TO RELATED APPLICATIONS

This application claims priority to U.S. Provisional Application 60/747,906, filed May 22, 2006. The disclosure of the prior application is considered part of (and is incorporated by reference in) the disclosure of this application.

BACKGROUND

Certain languages and cultures have a speaking style that is correlated with the social status of the participants and their relative status relative to one another. For example, Japanese may use different verb tenses and honorifics, depending on the relationship between the speaker and the other party or parties.

SUMMARY

The present application recognizes that current speech translation systems do not take into account socially cognizant translation. An embodiment addresses this issue by providing a translation that takes social cognizance into account.

Another embodiment relates to techniques for eliminating profanities within translated portions.

BRIEF DESCRIPTION OF THE DRAWINGS

These and other aspects will now be described in detail with reference the accompanying drawings, wherein.

DETAILED DESCRIPTION

The general structure and techniques, and more specific embodiments that can be used to effect different ways of carrying out the more general goals, are described herein.

Figure 1:
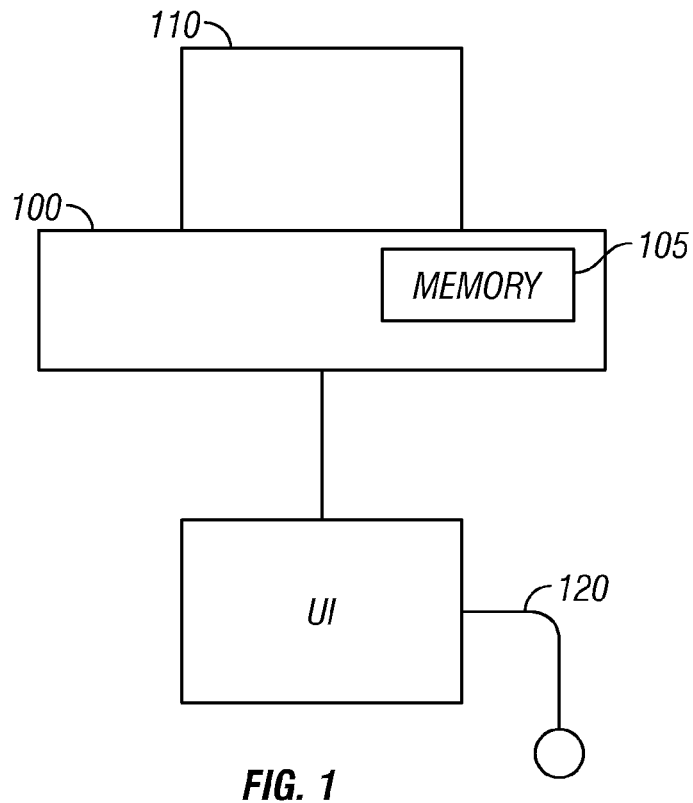
FIG. 1 illustrates a computer system that can be used to carry out embodiments.

The operation can be carried out by a programmed computer that runs the flowcharts described herein. The computer can be as shown in FIG. 1. FIG. 1 illustrates an embodiment where a computer 100 runs a program that is stored on the storage media 105. The program produces output, e.g., text type output on a display 110 or some other device that can provide information to the user, e.g., a printer, or audio output via an audio device that plays information to the user. The user can interact with the program and display via a user interface, which may include a keyboard, microphone, mouse, and any other user interface part materials 120.

In operation, the computer is programmed to carry out a speech operation.

An embodiment describes how participant's social status can be used to be part of the translation process in an automatic translation system. In the embodiment, translation is dependent upon many things including the social status of the participants in addition to the input speech. This technique can be used within language filtering, but can also be used with source and target languages that are the same.

Even within the same language, there may be mismatches within social registers, surface form text styles and expressions due to socioeconomic differences, economic background differences, as well as age and gender effects.

The embodiment recognizes that many variables can define a socially acceptable as well as understandable way of communicating with a person. Depending on the language, extreme respect to informalities may need to be demonstrated in certain circumstances. For example, extreme respect and formality may be demonstrated when addressing an official, superior, or tribe leader. Other times, respect does not need to be accompanied by formality, for example when addressing an older person who is not in a position of authority, or an older person who is a stranger.

In many instances, the spoken style of the source language speaker will be inappropriate for delivery to the target language speaker. This style difference may be due to cultural and linguistic gap, due to a generational or educational gap, or other differences.

The present application describes translating between source language and target language while maintaining appropriate levels of formality. In an embodiment, the source language and target language can belong to different styles of the same language.

An embodiment may also identify terms that may be potentially offensive within a specified language.

Figure 2:
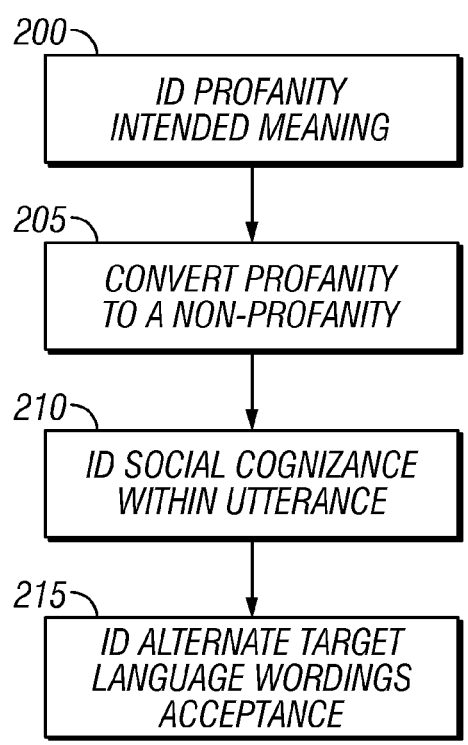
FIG. 2 illustrates a flowchart which follows a possible system of the embodiment.

In the embodiment, the system may follow the flowchart of FIG. 2. At 200, the source language (SL) is investigated, to identify potentially offensive language terms within the source language. For example, the potentially offensive terms may include profanities, mismatched registers, and others 200 may also attempt to identify the intended meaning of the profanity.

This identification of profanity meaning may be important if the profanity is being used to denote something other than the profane meaning of the profanity. For example, profanity may be used to denote emphasis in English.

In English, the phrase such as in "I am not (profanity) going there". In that case, the intended concept is "I am (emphasis) not going there" which may be translated in that way. The translation can be provided textually, with indication of emphasis, or can be provided as audio indicative of spoken translation. The audio can have information indicative of emphasis.

Also, profanities often do not translate properly, something that is profane in the source language might not be profane or meaningful when in the target language.

205 denotes converting the profanity to a non-profanity if possible.

210 illustrates identifying social cognizance within the utterances and appropriately transforming the utterances using this socially cognizant translation component. For example, this can be a cross-lingual translation.

215 illustrates identifying alternative target language utterances, and accepting the most appropriate one of those utterances for consumption by the target language speaker.

Figure 3:
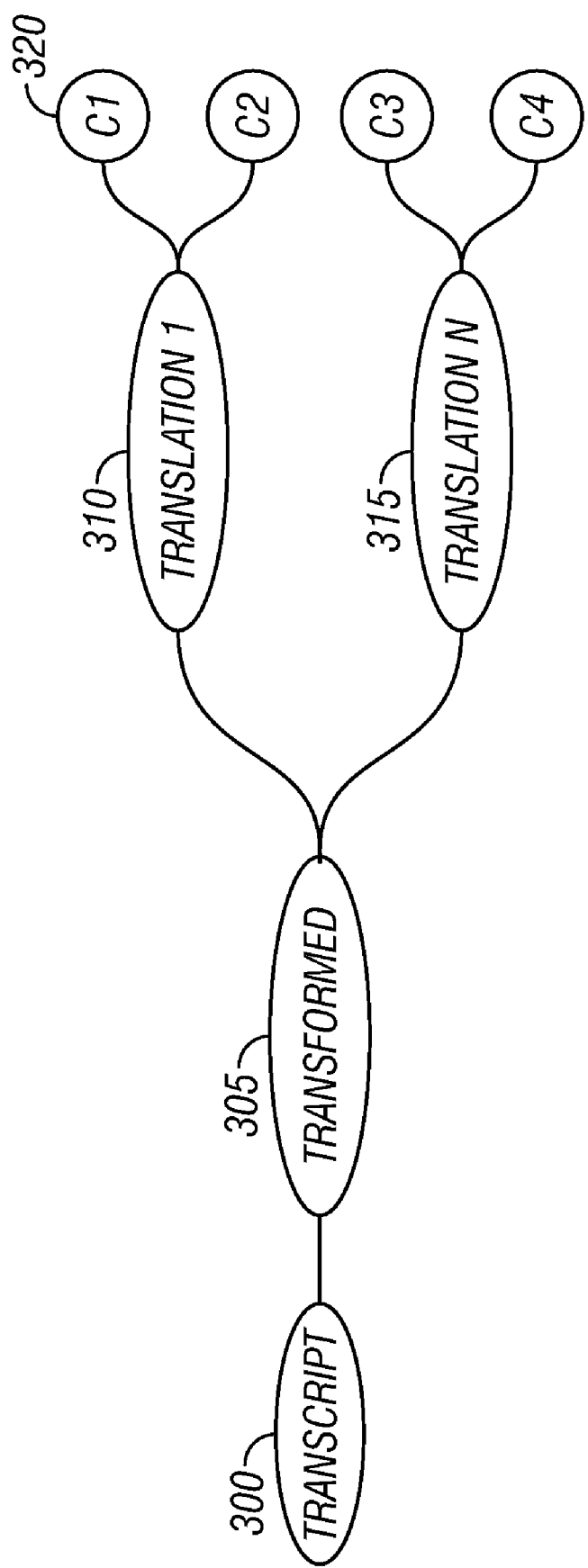
FIG. 3 illustrates a first kind of transformation strategy.

Consider an example as shown in FIG. 3. FIG. 3 illustrates a first kind of transformation strategy. First, the automatic speech recognition results are filtered so that profanities can be re-mapped to their intended meanings.

The transcript 300 is first transformed at 305, and converted into a number of translations, shown as 310, 315. Multiple translations are thus produced according to pre-existing translation modules which are utterance independent but socially transformationally dependent. This transformation could be, for example, as informal to formal, one form of informal to another form of informal, informal to respectful, flippant to non-flippant, sarcastic to non-sarcastic, and other filters.

The final steps are the choices within the language of the most appropriate utterances along the multiple utterances produced by the path. For example, the multiple utterances are shown generally as 320.

Figure 4:
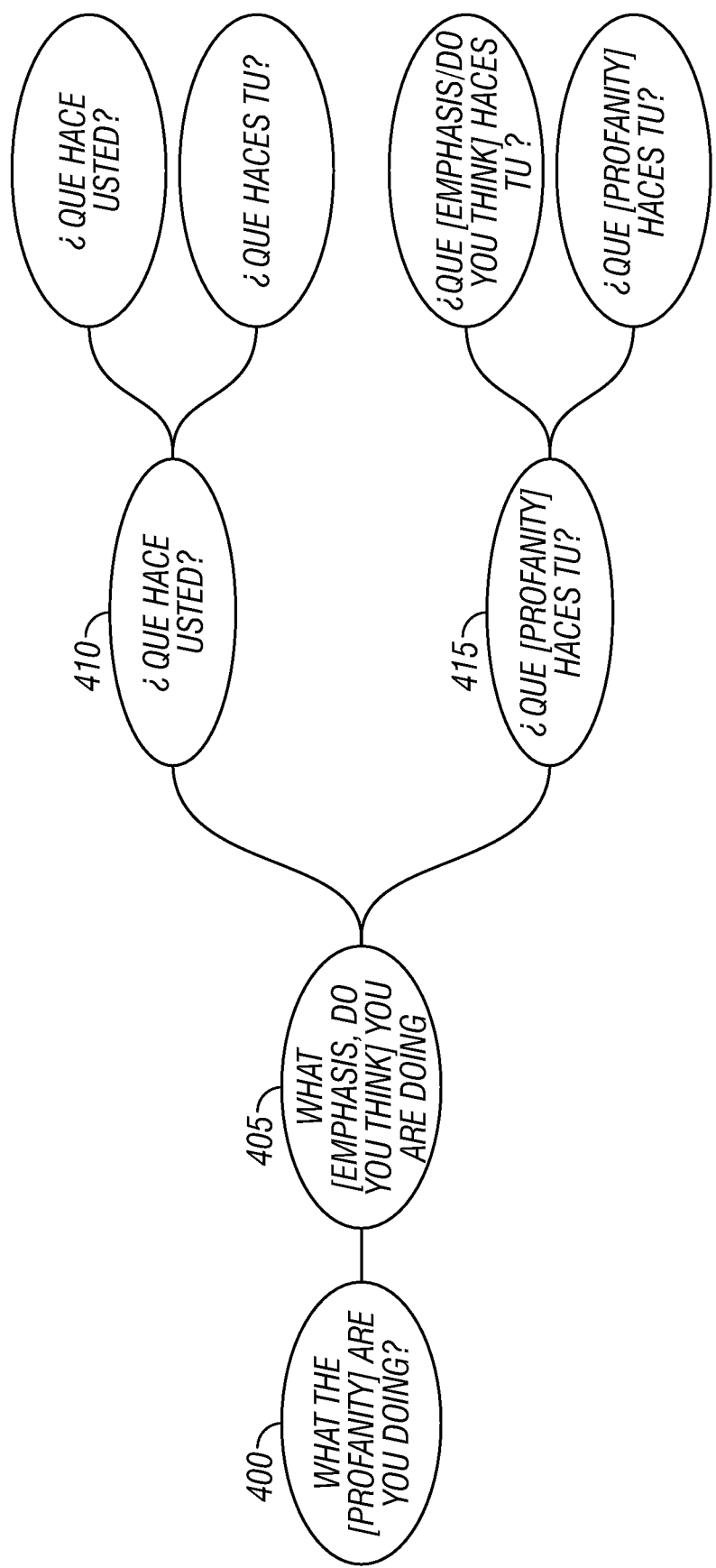
FIG. 4 illustrates transformation strategies which may be carried out.

Transformation strategies may be carried out as shown in FIG. 4. 400 shows a first transformation where in the source language the utterance 400 includes a profanity, specifically "what the (profanity) are you doing?"

This is changed at 405 to the different possibilities, "what (emphasis), do you think you're doing?"

The profanities are hence re-mapped to their intended meanings, and the translations along the appropriate paths.

The first path, "Que hace usted" at 410 is a first path. The second path at 415 includes the profanity within it, as "que (profanity) haces tu?", as well as including the profanity, this question is in a less polite tense.

As in the FIG. 3 example, these may be utterance independent but social transformationally dependent. For example, the social transformation can be as informal to formal; informal to informal; informal to respectful; flippant to non-flippant; sarcastic to non-sarcastic.

As in the embodiment, the tense can be changed based on the presence of a profanity. For example, the tense and/or tone of a translated sentence including a profanity may be constrained to be a tense appropriate for such a profanity, such as a very familiar tense.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, tense may be detected in other ways besides detection of profanities. In addition, this translation system can be used in different languages and language pairs than the specific ones that are disclosed. Also, this system can be used for oral translation or interpretation, but also can be used for text to text type translation.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method of translating, comprising:
   receiving information in a source language to be translated to a target language;
   determining information related to a social context within the information to be translated; and
   using said information related to social context in translating said information to a target language information output;
   wherein said information related to social context indicates a relative degree of familiarity between a speaker and a listener, and wherein said using said information related to social context comprises translating as a more familiar translation based on said relative degree of familiarity;
   wherein said determining the relative degree of familiarity includes determining a profanity within the information to be translated, and translating said profanity as a less formal translation, based on said detecting said profanity; and
   wherein said receiving, said determining and said using are performed by one or more computers programmed to perform said receiving, said determining and said using.

2. A method as in claim 1, wherein said using comprises identifying a number of alternative translations, and selecting one of the translations based on said information indicative of social context.

3. A method as in claim 1, further comprising producing an audio output indicative of said information in said target language.

4. A method as in claim 1, further comprising producing a text based output indicative of said information in said target language.

5. A method of translating, comprising:
   receiving information in a source language to be translated to a target language;
   determining information related to a social context within the information to be translated;
   using said information related to social context in translating said information to a target language; and
   detecting a profanity within the information in the source language to be translated, determining a meaning of the profanity, and translating the information using said meaning, without using any translation of said profanity;
   wherein detecting the profanity, determining the meaning and translating the information using said meaning are performed by one or more programmed computers.

6. A method as in claim 5, wherein said translating comprises changing an emphasis in the sentence based on a presence of the profanity.

7. A method, comprising:
   analyzing information in a source language;
   identifying a profanity in said source language;
   determining a meaning associated with the profanity and said source language; and
   translating to a target language without including said profanity within the translation;
   wherein said analyzing, identifying, determining and translating are performed by one or more computers programmed to perform said analyzing, identifying, determining and translating.

8. A method as in claim 7, wherein said translating comprises using the profanity to add an emphasis within the target language.

9. A method as in claim 7, wherein said translating comprises using the profanity to adjust the level of familiarity within a translation into the target language.

10. A method as in claim 7, further comprising determining information related to social context, and using said information to determine how to translate.

11. A method as in claim 10, wherein said information related to social context is information that indicates a relative degree of familiarity between a speaker and a listener, and wherein said using said information related to social context comprises translating as a more familiar translation based on said relative degree of familiarity.

12. A method as in claim 11 wherein said using comprises translating said profanity as a more formal translation that does not include said profanity, or as a less formal translation.

13. A method as in claim 8, wherein said emphasis is an emphasis in an oral translation.

14. A method as in claim 8, wherein said emphasis is an emphasis in a written translation.

15. A translating system, comprising:
an input part, receiving information in a source language to be translated to a target language; and
a computer, receiving said information to be translated, and analyzing said information to be translated to determine information related to a social context within the information to be translated, and using said information related to social context in translating said information to a target language;
wherein said information related to social context determined by said computer, is information that indicates a relative degree of familiarity between a speaker and a listener, and wherein said computer carries out said translating as a more familiar translation when said information indicative of social context indicates more familiarity; and
wherein said computer identifies a profanity within the information in the source language to be translated as part of said relative degree of familiarity.

16. A system as in claim 15, wherein said computer translates as a less formal translation, based on said detecting said profanity.

17. A translating system, comprising:
an input part, receiving information in a source language to be translated to a target language; and
a computer, receiving said information to be translated, and analyzing said information to be translated to determine information related to a social context within the information to be translated, and using said information related to social context in translating said information to a target language;
wherein said computer also operates to detect a profanity within the information in the source language to be translated, determine a meaning of the profanity, and translate the information using said meaning, without using any translation of said profanity.

18. A system as in claim 17, wherein said computer changes an emphasis in the sentence based on a presence of the profanity.

19. A system as in claim 18, wherein said computer produces audio output indicative of the translated speech, with said emphasis therein.

* * * * *